United States Patent
Ogawa

(10) Patent No.: US 8,271,142 B2
(45) Date of Patent: Sep. 18, 2012

(54) DEVICE AND METHOD FOR CONTROLLING VALVE

(75) Inventor: Yoshio Ogawa, Setagaya-ku (JP)

(73) Assignee: Fujikoki Corporation, Tokyo (JP)

( * ) Notice: Subject to any disclaimer, the term of this patent is extended or adjusted under 35 U.S.C. 154(b) by 860 days.

(21) Appl. No.: 12/403,087

(22) Filed: Mar. 12, 2009

(65) Prior Publication Data

US 2009/0228153 A1   Sep. 10, 2009

(51) Int. Cl.
*G05D 7/00* (2006.01)
*G05D 11/00* (2006.01)
*G05B 13/02* (2006.01)

(52) U.S. Cl. ............. 700/282; 700/41; 700/42; 700/43; 700/289; 702/45; 137/51

(58) Field of Classification Search ............. 700/37, 700/41–43, 282, 289; 702/45; 137/51
See application file for complete search history.

(56) References Cited

U.S. PATENT DOCUMENTS

| | | | |
|---|---|---|---|
| 7,021,298 B2 * | 4/2006 | Nakazawa et al. | 123/568.14 |
| 7,320,434 B2 * | 1/2008 | Suda et al. | 236/34 |
| 7,903,700 B2 * | 3/2011 | Nagai et al. | 372/20 |
| 2003/0100451 A1 * | 5/2003 | Messier et al. | 507/100 |
| 2003/0102125 A1 * | 6/2003 | Wellington et al. | 166/266 |
| 2003/0167822 A1 * | 9/2003 | Johnson et al. | 73/1.16 |
| 2005/0006487 A1 * | 1/2005 | Suda et al. | 236/46 R |
| 2005/0229909 A1 * | 10/2005 | Nakazawa et al. | 123/568.14 |
| 2007/0155019 A1 * | 7/2007 | Johnson et al. | 436/180 |

* cited by examiner

*Primary Examiner* — Ramesh Patel
(74) *Attorney, Agent, or Firm* — Stetina Brunda Garred & Brucker

(57) ABSTRACT

Provided is an easy to use valve controller designed to obtain optimum operation performance. The valve controller is designed to control the valve opening of an expansion valve by calculating the valve opening such that a detected temperature coincides with a target temperature. The valve controller includes an automatic for calculating a deviation between the detected temperature and the target temperature and for calculating a changing amount of the valve opening by substituting at least the deviation and a set control parameter into an arithmetic expression to automatically set the control parameter. The valve controller further includes and control level adjuster for adjusting a magnitude of the valve opening calculated with the control parameter set by the automatic tuning means in stages in accordance with a set control level.

4 Claims, 7 Drawing Sheets

DEVICE AND METHOD FOR CONTROLLING VALVE

CROSS-REFERENCE TO RELATED APPLICATIONS

The present application claims priority to Japanese Patent Application No. 2007-324164 filed on Dec. 17, 2007.

STATEMENT RE: FEDERALLY SPONSORED RESEARCH/DEVELOPMENT

Not Applicable

BACKGROUND OF THE INVENTION

1. Technical Field of the Invention

The present invention relates to a valve controller and a valve controlling method, and more particularly to a device and the like for controlling valve opening of a motor-driven valve for adjusting the quantity of refrigerant and others.

2. Description of the Related Art

Motor-driven valves are adaptable for various kinds of usage such as expansion valves for controlling the quantity of refrigerant in refrigeration cycles. PID control used for controlling valve opening of the motor-driven valve also is, as disclosed in Patent document 1, a controlling method for obtaining an operation amount (opening of motor-driven valve) through calculation by substituting control parameters (PID coefficients) determined by the system and load where the controlling method is applied and so on, that is, a proportional band PB (proportional coefficient Kp), an integral time Ti, a differential time Td and a deviation between temperature of controlled object (degree of superheat) and target temperature (target degree of superheat) to an arithmetic expression for control with proportional term, integral term and differential term.

Further, the control parameters (PID coefficients) were required to be changed in magnitude in accordance with the system and load to obtain the optimum temperature control performance, and abundant experience and expert knowledge were required to manually set the parameters. Therefore, the parameters have been set by a skillful user with long-term experience based on a trial-and-error technique through test run with actual device or the like for a long period of time while repeatedly performing variety of patterns. From this viewpoint, in recent years, as disclosed in Patent documents 1 and 2, automatic tuning functions for automatically setting the control parameters were developed, with the functions, it became possible for even users without abundant experience and expert knowledge to relatively easily set the control parameters.

[Patent document 1] Japanese Patent Publication Showa 58-68107 gazette
[Patent document 2] Japanese Patent Publication 2000-155603 gazette

BRIEF SUMMARY OF THE INVENTION

However, the control parameters set by the automatic tuning function are some criteria, so that fine adjustment of the parameters may be required by confirming temperature control performance through test run with real device, real load and so on. For example, a work becomes necessary to seek coefficients to obtain the optimum controllability while confirming temperature responsiveness and separately and gradually changing each coefficient PB, Ti and Td.

However, since judging increase and decrease of each coefficient to what extent while confirming the responsiveness requires abundant experience and expert knowledge on the PID control, when less-experienced users or users with limited knowledge set the control parameters with the automatic tuning function, change of the PB, Ti and Td each in fine adjustment stage becomes inappropriate, so that it takes long time to find out the optimum coefficients, and further in dependence on changing way of the coefficients, on the contrary, there is a fear that control performance deteriorates.

Therefore, the present invention has been made in consideration of the above problems in the conventional art, and the object thereof is to provide a valve controller and the like which are convenient for users in that, even users without abundant experience and expert knowledge can obtain the optimum operation performance for a short period of time; and it can be prevented that control performance is caused to be deteriorated on the contrary in dependence on changing way of the coefficients and so on.

To achieve the above object, the present invention relates to a valve controller for controlling valve opening by calculating the valve opening such that a detected temperature coincides with a target temperature, and the controller is characterized by comprising: automatic tuning means for calculating a deviation between the detected temperature and the target temperature, calculating the valve opening by substituting at least the deviation and a set control parameter into an arithmetic expression, and automatically setting the control parameter; and control level adjusting means for adjusting a magnitude of the valve opening calculated with the control parameter set by the automatic tuning means in stages in accordance with a set control level.

With the present invention, the control level adjusting means allows the magnitude of the valve opening calculated with the control parameter set by the automatic tuning means to be adjusted in stages, so that the work for obtaining the optimum controllability while confirming temperature responsiveness through test run with real device, real load and so on, and changing each coefficient PB, Ti and Td becomes unnecessary, so that even users without abundant experience and expert knowledge can obtain the optimum operation performance for a short period of time. In addition, it can be prevented that control performance is caused to be deteriorated on the contrary in dependence on changing way of the coefficients and so on, which provides a convenient valve controller for users.

In the above valve controller, the valve may be an expansion valve in a refrigeration cycle system, and the detected temperature may be a degree of superheat, which makes it possible to easily obtain the optimum control performance in a refrigeration cycle system with automatic tuning function for a short period of time, and so on.

In the valve controller described above, the control level adjusting means can adjust the magnitude of the valve opening calculated with the arithmetic expression by multiplying a predetermined coefficient according to the control level that can be set in stages to the deviation, the control parameter, or a changing amount of the valve opening calculated by the arithmetic expression.

In the above valve controller, the arithmetic expression may be a control arithmetic expression used for one of P control, PI control, PD control and PID control.

Further, the present invention relates to a valve controlling method of controlling valve opening by calculating the valve opening such that a detected temperature coincides with a target temperature comprising the steps of: calculating a deviation between the detected temperature and the target temperature, calculating the valve opening by substituting at least the deviation and a set control parameter into an arithmetic expression, and automatically setting the control parameter; and adjusting a magnitude of the valve opening calculated with the automatically set control parameter in stages in accordance with a set control level. With the present invention, in the same manner as the inventions described above, it is possible to provide a convenient valve controlling method for users in that the work to obtain the optimum controllability while changing PB and other coefficients through test run with real device, real load and so on becomes unnecessary, so that even users without abundant experience and expert knowledge can obtain the optimum operation performance for a short period of time, etc.

As mentioned above, with the present invention, it is possible to provide a convenient valve controller and others for users in that even users without abundant experience and expert knowledge can obtain the optimum operation performance for a short period of time, and it can be prevented that control performance is caused to be deteriorated on the contrary in dependence on changing way of the coefficients and so on.

DETAILED DESCRIPTION OF THE INVENTION

Next, embodiments of the present invention will be explained in detail with reference to drawings. In the following explanations, a valve controller of the present invention is exemplarily used for a device for controlling an expansion valve (motor-driven valve) disposed in a refrigeration cycle system.

Figure 1:
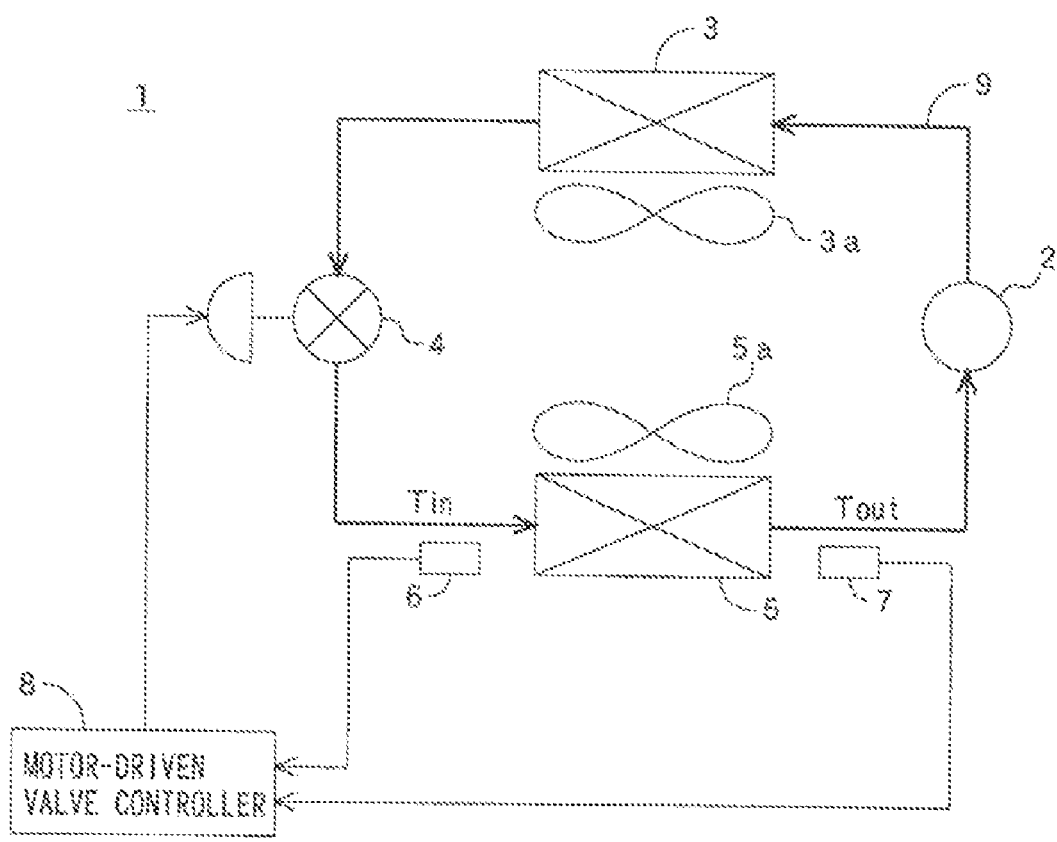
FIG. 1 is a drawing showing the construction of an example of a refrigeration cycle with a valve controller according to the present invention.

FIG. 1 shows a refrigeration cycle system (hereinafter referred to as "system") with a valve controller according to the present invention, and the system 1 is provided with a compressor 2, a condenser 3, a fan 3a for the condenser 3, an expansion valve (motor-driven valve) 4, an evaporator 5, a fan 5a for the evaporator 5, an inlet temperature sensor 6, an outlet temperature sensor 7 and a valve controller 8.

The compressor 2, the condenser 3, the expansion valve 4 and the evaporator 5 are connected with each other through a conduit 9, and among them circulates refrigerant. Here, the quantity of the refrigerant flowing through the conduit 9 is controlled by adjusting valve opening of the expansion valve 4.

The compressor 2 compresses the refrigerant in low pressure gas state fed from the evaporator 5 and changes it into a high pressure gas so as to be fed to the condenser 3 through the conduit 9.

The condenser 3 liquefies the refrigerant in high pressure gas state fed from the compressor 2 to change it into refrigerant in high pressure liquid to remove condensation heat, and the condenser 3 releases the removed heat outside through air blow by the fan 3a for the condenser 3.

The expansion valve 4 changes the refrigerant in high pressure liquid state fed from the condenser 3 into low pressure refrigerant. This expansion valve 4 is provided with a built-in pulse motor 4a (shown in FIG. 2), which is driven in accordance with driving signals from the valve controller 8, and rotation of the pulse motor 4a with rotational angels in accordance with the number of pulses of the driving signals adjusts the valve opening of the expansion valve 4.

The evaporator 5 is provided to evaporate (vaporize) the refrigerant in low pressure liquid state, and the refrigerant removes evaporation heat from its circumference through the evaporation, and is heated. At this moment, recovered heat cools ambient air around the evaporator 5, and the cooled air is released by the air blow by the fan 5a for the evaporator 5 for temperature adjustment of a temperature-controlled object (such as room temperature).

For the inlet temperature sensor 6 and the outlet temperature sensor 7 are used three-wire system platinum thermometric resistors for instance, which are temperature sensors capable of accurate measurement. The inlet temperature sensor 6 detects temperature Tin of the refrigerant at an inlet of the evaporator 5 that is the refrigerant in liquid state, and the outlet temperature sensor 7 detects temperature Tout of the refrigerant at an outlet of the evaporator 5 that is the refrigerant in gas state.

The valve controller 8 is provided to control valve opening of the expansion valve 4, and, in accordance with Formula I below, calculates a deviation between a degree of superheat Tsh of the refrigerant at the evaporator 5 (detected temperature Tout by the outlet temperature sensor 7—detected temperature Tin by the inlet temperature sensor 6) and a set degree of superheat Ts, that is a deviation $e(t)=Ts-Tsh$; substitutes this deviation $e(t)$ and set control parameters (PID coefficients) into the following arithmetic expression to obtain valve opening of the expansion valve 4; and outputs driving signals in accordance with the valve opening obtained to the pulse motor 4a of the expansion valve 4. Here, Kp is a proportional gain.

In addition, the valve controller 8 is provided with an automatic tuning function for performing automatic calculation and setting of the control parameters (PB, Ti and Td) of the PID control as well as a function (control level adjusting means) capable of adjusting magnitude of the valve opening obtained by using the control parameters set by the automatic tuning means in accordance with a set control level in stages.

Next, adjustment of the control level by the control level adjusting means will be explained in detail mainly with reference to Table 1 below.

Table 1 is used for sensuously adjusting the magnitude of the valve opening while operating an actual device with actual load and with control parameters set by the automatic tuning means and confirming its responsiveness, and the table is used for fine adjustment by changing the control levels based on judgment such as slightly strengthening the control or slightly weakening the control for instance.

The control levels are classified into 10 stages (excluding control level 0), and the level 0 shows a case that the operation is carried out with the same parameters as those set by the automatic tuning. As symbol of the control level is minas and absolute value thereof increases, that is, as ascending in the table, control becomes weak. On the contrary, as symbol of the control level is plus and absolute value thereof increases, that is, as descending in the table, control becomes strong. In this connection, control levels are not limited to be divided into 10 stages, but less or more than 10 stages are applicable.

Multiplied coefficients are determined in accordance with each control level. With the coefficients, almost the same control level can be obtained in the all cases when multiplying to the deviation e(t), to each control parameter PB, Ti and Td and to a changing amount of the valve opening m(t), the coefficients vary among the cases.

When the control level is 0, the coefficient multiplied to the deviation e(t) is "1.0", and as the symbol of the control level is minas and the absolute value thereof increases, the coefficients change from a5 to a1, as directing from a5 to a1, the coefficients become gradually small (1.0>a5>a4>a3>a2>a1) below "1.0", which gradually weakens the control. On the other hand, as the symbol of the control level is plus and the absolute value thereof increases, the coefficients change from a6 to a10, as directing from a6 to a10, the coefficients become gradually large (1.0<a6<a7<a8<a9<a10) over "1.0", which gradually strengthens the control.

The coefficients multiplied to the control parameters are set for each of the PB, Ti and Td, and the coefficients multiplied to the PB are, in case that the control level is 0, "1.0", and as the symbol of the control level is minas and the absolute value thereof increases, the coefficients change from b5 to b1, as directing from b5 to b1, the coefficients become gradually large (1.0<b5<b4<b3<b2<b1) over "1.0", which gradually weakens the control. On the other hand, as the symbol of the control level is plus and the absolute value thereof increases, the coefficients change from b6 to b10, as directing from b6 to b10, the coefficients become gradually small (1.0>b6>b7>b8>b9>b10) below "1.0", which gradually strengthens the control.

Further, the coefficients multiplied to the Ti are, in case that the control level is 0, "1.0", and as the symbol of the control level is minas and the absolute value thereof increases, the coefficients change from c5 to c1, as directing from c5 to c1, the coefficients become gradually large (1.0<c5<c4<c3<c2<c1) over "1.0", which gradually weakens the control. On the other hand, as the symbol of the control level is plus and the absolute value thereof increases, the coefficients change from c6 to c10, as directing from c6 to c10, the coefficients become gradually small (1.0>c6>c7>c8>c9>c10) below "1.0", which gradually strengthens the control.

On the other hand, the coefficients multiplied to the Td is, in case that the control level is 0, "1.0", and as the symbol of the control level is minas and the absolute value thereof increases, the coefficients change from d5 to d1, as directing from d5 to d1, the coefficients become gradually small (1.0>d5>d4>d3>d2>d1) below "1.0", which gradually weakens the control. On the other hand, as the symbol of the control level is plus and the absolute value thereof increases, the coefficient changes from d6 to d10, as directing from d6 to d10, the coefficients become gradually large (1.0<d6<d7<d8<d9<d10) over "1.0", which gradually strengthens the control.

When adjusting the control parameters, the magnitude of the values thereof has, as clearly understood by the above arithmetic expression for PID control, the relations shown in Table 2 below, the coefficients multiplied to the control parameters are decided as described above.

Further, the coefficients multiplied to the changing amount of the valve opening m(t) is, in case that the control level is 0, "1.0", and as the symbol of the control level is minas and the absolute value thereof increases, the coefficients change from e5 to e1, as directing from e5 to e1, the coefficients become gradually small (1.0>e5>e4>e3>e2>e1) below "1.0", which gradually weakens the control. On the other hand, as the symbol of the control level is plus and the absolute value thereof increases, the coefficients change from e6 to e10, as directing from e6 to e10, the coefficients become gradually large (1.0<e6<e7<e8<e9<e10) over "1.0", which gradually strengthens the control.

To the deviation e(t), control parameters (PB, Ti and Td), or the changing amount of the valve opening m(t) are multiplied the coefficients shown in Table 1 in accordance with the control levels, which allows the changing amount of the valve opening m(t) obtained by the arithmetic expression to be adjusted in proportion to the magnitude of the set control level.

Figure 2:
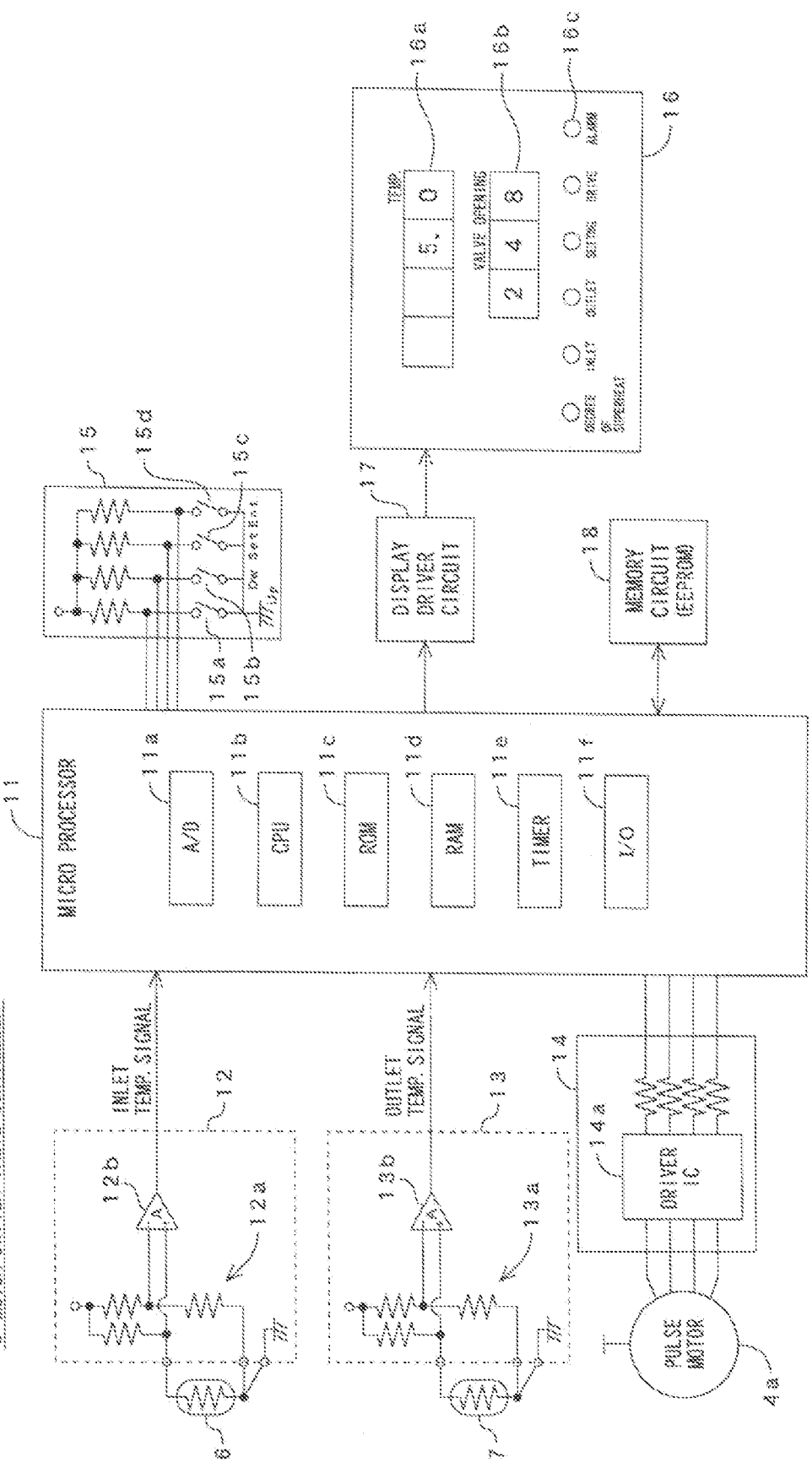
FIG. 2 is a block diagram showing the valve controller shown in FIG. 1 and peripheral circuits around the controller in detail.

The valve controller 8 is, as shown in FIG. 2, provided with a micro processor 11, an inlet temperature detecting circuit 12, an outlet temperature detecting circuit 13, a motor-driven valve driving circuit 14, an input circuit 15, a display circuit 16, a display driver circuit 17 and a memory circuit (EEPROM) 18.

The inlet temperature detecting circuit 12 is a resistance-voltage conversion circuit that converts a resistance value of the inlet temperature sensor 6 to a DC-voltage signal and outputs it to the micro processor 11. This inlet temperature detecting circuit 12 consists of a bridge circuit 12a and an amplifying circuit 12b amplifying the voltage between intermediate terminals of the bridge circuit 12a to accurately detect the temperature Tin of the refrigerant at the inlet of the evaporator 5.

The outlet temperature detecting circuit 13 is a resistance-voltage conversion circuit that converts a resistance value of the outlet temperature sensor 7 to a DC-voltage signal and outputs it to the micro processor 11. This outlet temperature detecting circuit 13 also consists of a bridge circuit 13a and an amplifying circuit 13b to accurately detect the temperature Tout of the refrigerant at the outlet of the evaporator 5.

The input circuit 15 is disposed to input a set degree of superheat (target temperature) Ts, upper and lower opening limits of the expansion valve 4 (for instance, when the motor-driven valve is used with 100 pulses to 400 pulses, the upper opening limit is set to be 400 pulses and the lower opening limit to be 100 pulses), each coefficient for P (proportional), I (integral) and D (differential) at the PID control, and so on. These varieties of input values can be set as set values, and the set values set can be changed with the input circuit 15 also. Methods of setting the input value and changing the set value will be explained below in detail.

This input circuit 15 is provided with four tact switches 15a to 15d (up switch 15a, down switch 15b, set switch 15c and enter switch 15d), and ON/OFF state of the tact switches 15a to 15d is outputted to the micro processor 11.

The display circuit 16 is provided with a temperature displaying element 16a, a valve opening displaying element 16b and a plurality of LEDs 16c. The temperature displaying element 16a displays the refrigerant temperature Tin at the inlet and the refrigerant temperature Tout at the outlet of the evaporator 5, and the degree of superheat Tsh (=Tout−Tin) while switching them, and in a setting mode, set values of the set degree of superheat Ts, the upper opening limit, the lower opening limit and others are displayed. In addition, the valve opening displaying element 16b displays the present opening of the expansion valve 4 by the number of pulses from fully closed state.

The plurality of LEDs 16c illuminate in relation to display items of the temperature displaying element 16a and the valve opening displaying element 16b, and consists of six LEDs from "degree of superheat" to "alarm". Each LED for "degree of superheat", "inlet" and "outlet" shows a display item of the temperature displaying element 16a and illuminates in relation to the temperature displayed on the temperature displaying element 16a. Further, the LED for "setting" illuminates when the valve controller 8 is in a setting mode, and the LED for "drive" illuminates when the valve controller 8 is in operation. The LED for "alarm" illuminates when output data of the inlet temperature sensor 6 or the outlet temperature sensor 7 is abnormal.

The display driver circuit 17 amplifies a signal from the micro processor 11 and outputs the amplified signal to the display circuit 16. The memory circuit 18 stores the above set values and so on for backing up.

The motor-driven valve driving circuit 14 is disposed to amplify a drive control signal from the micro processor 11 and output driving pulses to the pulse motor (stepping motor) 4a built in the expansion valve 4, and is provided with a driver IC (integrated circuit) (driving signal amplifying circuit) 14a, etc.

The micro processor 11 is provided with an A/D converter 11a, a CPU (Central Processing Unit) 11b, a ROM 11c, a RAM 11d, a timer 11e, an I/O (11f) and so on. The A/D converter 11a converts analog signals on temperature outputted from the inlet temperature detecting circuit 12 and the outlet temperature detecting circuit 13 to digital signals, and the CPU 11b interprets and executes programs stored in the ROM 11c. The ROM 11c is a nonvolatile memory storing an operation program for executing valve opening control by PID control operation described below, a program for executing automatic tuning, a program for adjusting control levels, a display control program and so on. The RAM 11d functions as a work memory of the CPU 11b. The timer 11e is provided to perform interrupt processing and so on, and the I/O (11f) is provided to exchange data between the CPU 11b and other devices.

Figure 3:
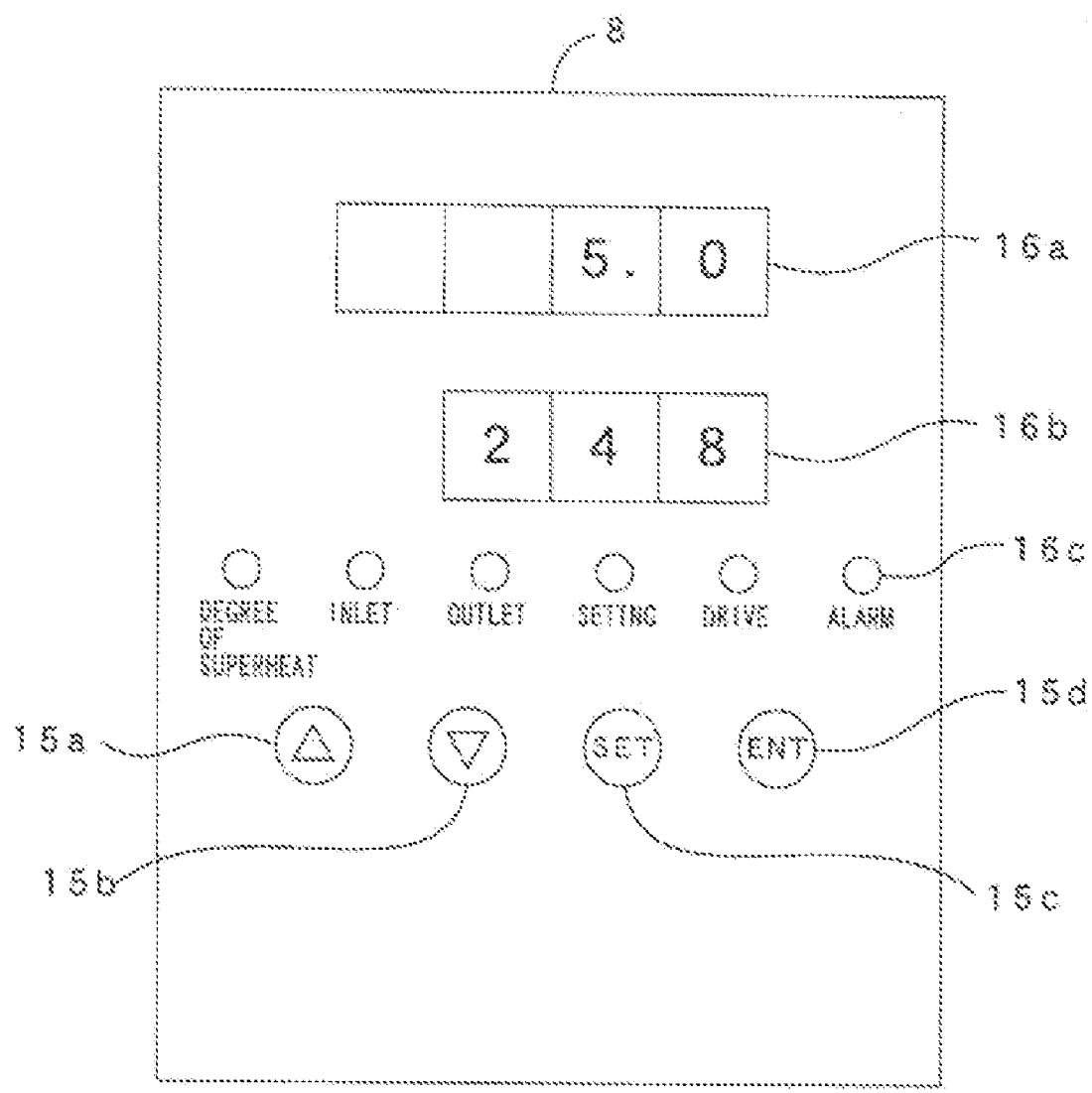
FIG. 3 is a block diagram showing the external appearance of the surface of a main body of the valve controller according to the present invention.

Next, the whole stream of inputting (changing) operation of each set value with the input circuit 15 and the display circuit 16 shown in FIG. 2 will be explained with reference to FIG. 3 and Table 3 below. Meanwhile, FIG. 3 is a block diagram showing an external view of the surface of a main body of the valve controller 8.

For instance, under the condition that on the temperature displaying element 16a is displayed a temperature, and on the valve opening displaying element 16b is displayed the present valve opening, depressing the set switch 15c enters the setting mode, and the temperature displaying element 16a shifts from a normal temperature display mode to a set value display mode, and the valve opening displaying element 16b switches display from the present valve opening to a setting item. The set value displayed on the temperature displaying element 16a can be increased or decreased by depressing the up switch 15a or the down switch 15b, and depressing the enter switch 15d allows the displayed set value to be renewed and stored as a new set value.

On the other hand, the setting items are, for example as shown in Table 3, nine in number, and on the valve opening displaying element 16b is displayed a set value number and a symbol, for instance, "1. HV". This setting item is, in the setting mode, by depressing the set switch 15c, sequentially switched to the next one, and when the setting item 9 ("8. CL) is displayed, depressing the set switch 15c quits the setting mode and returns to the condition that temperature and valve opening are displayed.

Figure 4:
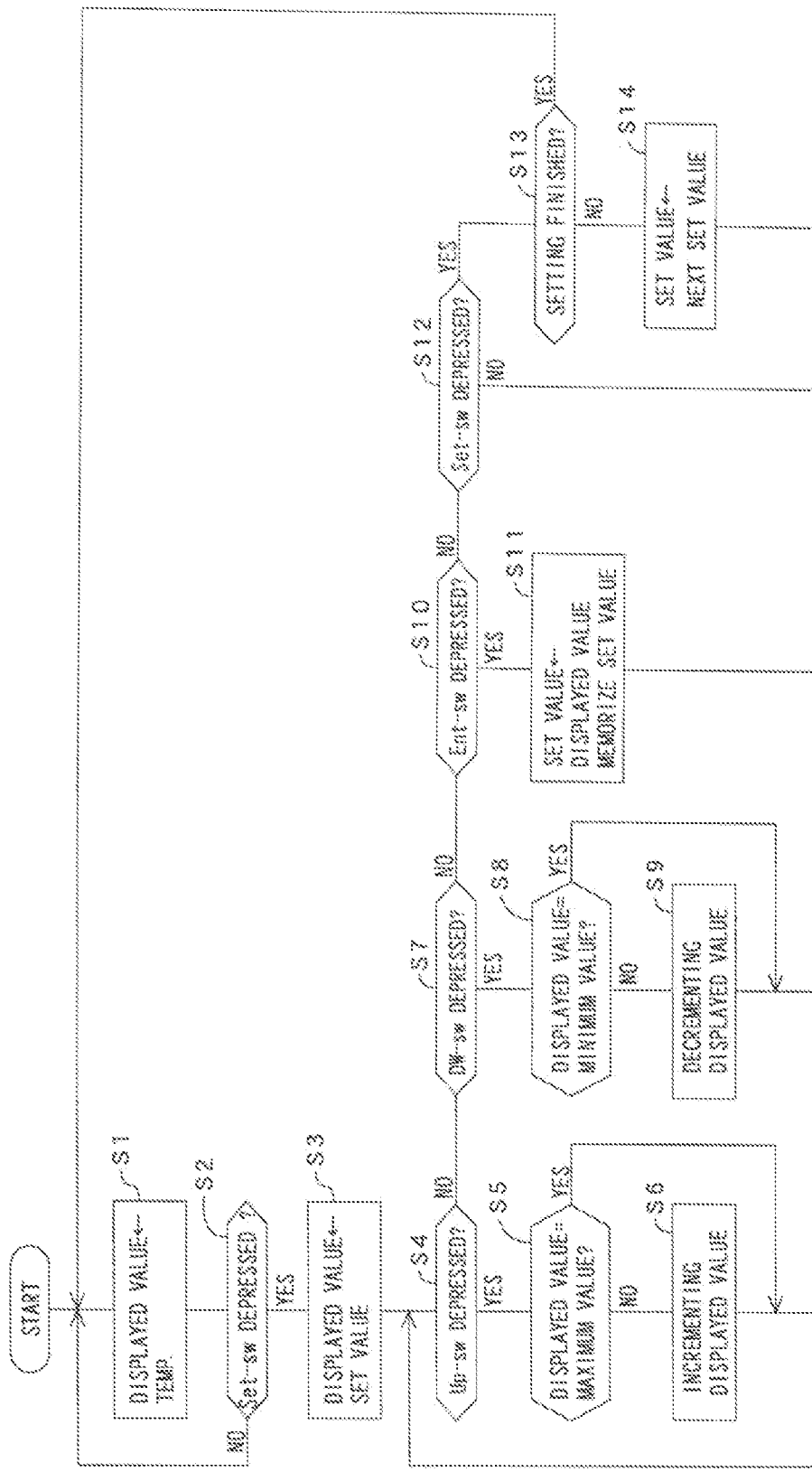
FIG. 4 is a flow chart for explaining a motion of changing a set value with an input device of the valve controller according to the present invention.

Next, concrete flow of the set value changing operation will be explained mainly with reference to FIG. 4 and with FIG. 3.

When displaying a temperature on the temperature displaying element 16a (Step S1), in Step S2, whether or not the set switch 15c is depressed is judged, and when depressed, in Step S3, on the temperature displaying element 16a is displayed a set value, and on the valve opening displaying element 16b is displayed a number and a symbol corresponding to the set value, and it enters the setting mode, when the set switch 15c is not depressed, it returns to the condition of Step S1.

Next, in Step S4, whether or not the up switch 15a is depressed is judged, when depressed, in Step S5, whether or not displayed value of the temperature displaying element 16a is the maximum value of the set value is judged. As a result of the judgment, when the displayed value is not the maximum value of the set value, in Step S6, the displayed value is incremented and it returns to Step S4. On the other hand, when the displayed value is the maximum value of the set value, it returns to Step S4 as it is.

In Step S4, when the up switch 15a is judged not to be depressed, in Step S7, whether or not the down switch 15b is depressed is judged, when depressed, in Step S8, whether or not the displayed value is the minimum value of the set value is judged, when the displayed value is not the minimum value of the set value, in Step S9, the displayed value is decremented and it returns to Step S4. On the other hand, when the displayed value is the minimum value of the set value, it returns to Step S4 as it is.

In Step S7, when the down switch 15b is judged not to be depressed, in Step S11, whether or not the enter switch 15d is depressed is judged, when depressed, in Step S11, the set value is renewed to the present displayed value, and the renewed set value is stored in the memory circuit 18 of FIG. 2 and it returns to Step S4.

When the enter switch 15d is not depressed in Step S10, in Step S12, whether or not the set switch 15c is depressed is judged, when judged not to be depressed, it returns to Step S4.

In Step S12, when the set switch 15c is judged to be depressed, in Step S13, whether or not the setting is finished is judged. Concretely, in Step S12, under the condition that the setting item 8 "control level" is displayed, when the set switch 15c is judged to be depressed, the setting mode is judged to be finished in Step S13, it returns to Step S1. On the other hand, in Step S12, under the condition that an item other than the setting item 8 "control level" is selected, when the set switch 15c is depressed, in Step S14, the next set value is displayed on the temperature displaying element 16a; the number and symbol corresponding to the next setting is displayed on the valve opening displaying element 16b; it returns to Step S4; and the above motions are repeated.

Next, control motion performed by the valve controller 8 of the refrigeration cycle system 1 described above will be explained. At first, with reference to FIGS. 1, 2 and 5, mainly, the motion of the micro processor 11 constituting a main section of the valve controller 8 will be explained when to the deviation e(t) is multiplied the coefficient shown in Table 1 in accordance with each control level. In the control motion, the micro processor 11, with the timer 11e, performs interrupt processing shown in FIG. 5 at predetermined intervals for example at one-second intervals.

Figure 5:
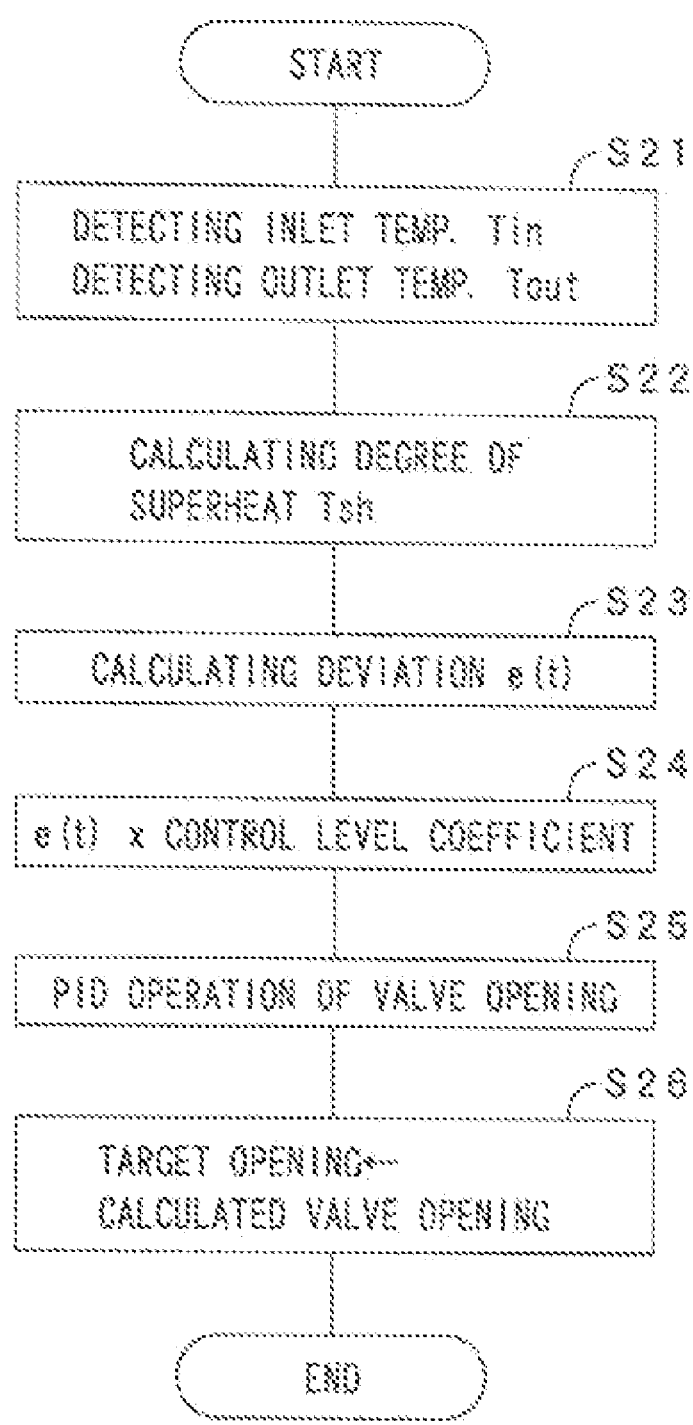
FIG. 5 is a flow chart for explaining an example of interrupt processing motion of the valve controller shown in FIG. 2.

When the interrupt processing starts, as shown in FIG. 5, the CPU 11b firstly captures each of the temperatures Tin and Tout of the refrigerants, which are A/D converted, at the inlet and outlet of the evaporator 5 (Step S21), and calculates the present degree of superheat Tsh=Tout−Tin (Step S22). Then, the CPU 11b calculates a deviation e(t) between the set degree of superheat Ts and the present degree of superheat Tsh, that is, e(t)=Ts−Tsh (Step S23).

Next, to the deviation e(t) obtained as described above is multiplied a coefficient corresponding to the control level shown in Table 1. For instance, when the control level is "−2", "a4"; when the control level is "0", "1.0"; and when the control level is "3", "a8" is multiplied to the deviation e(t) respectively (Step S24).

Next, based on the deviation e(t) to which coefficients in accordance with serial control levels in the past, the proportional band PB, the integral time Ti and the differential time Td, with the above arithmetic expression, a manipulated variable m(t) of the valve opening this time is calculated through PID (proportional/integral/differential) operation (Step S25), and from the arithmetic result, a target opening is calculated, and a calculated valve opening is set to be the target opening (Step S26).

With the motion described above, a target opening that the expansion valve 4 should reach is set, and after storing the target opening to the RAM 11d, the micro processor 11 supplies a driving signal from the driver IC 14a of the motor-driven valve driving circuit 14 to the pulse motor 4a such that the valve opening of the expansion valve 4 becomes the target opening stored in the RAM 11d.

Next, control motion performed by the valve controller 8 of the refrigeration cycle system 1 described above, mainly, motion of the micro processor 11 constituting a main section of the valve controller 8 will be explained, with reference to FIGS. 1, 2 and 6, in which to the parameters (PB, Ti and Td) are multiplied coefficients shown in Table 1. In the control motion, the micro processor 11 performs, using the timer 11e, interrupt processing shown in FIG. 6 at predetermined intervals for example at one-second intervals.

Figure 6:
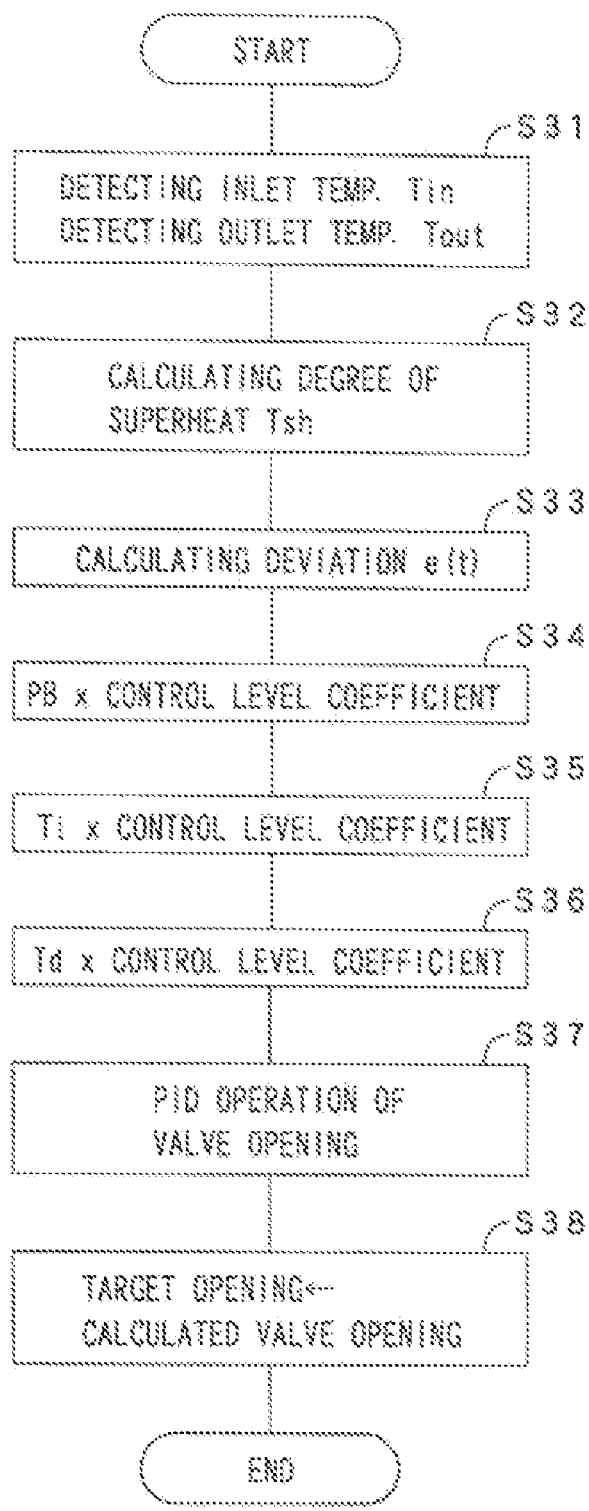
FIG. 6 is a flow chart for explaining an example of interrupt processing motion of the valve controller shown in FIG. 2.

When the interrupt processing starts, as shown in FIG. 6, the CPU 11b firstly captures each of the temperatures Tin and Tout of the refrigerants, which are A/D converted, at the inlet and outlet of the evaporator 5 (Step S31), and calculates the present degree of superheat Tsh=Tout−Tin (Step S32). Then, the CPU 11b calculates a deviation e(t) between the set degree of superheat Ts and the present degree of superheat Tsh, that is, e(t)=Ts−Tsh (Step S33).

Next, to the present PB is multiplied a coefficient corresponding to the control level shown in Table 1. For instance, when the control level is "−3", "b3"; when the control level is "0", "1.0"; and when the control level is "2", "b7" is multiplied to the PB respectively (Step S34).

Further, to the present Ti is multiplied a coefficient corresponding to the control level shown in Table 1. For instance, when the control level is "−3", "c3"; when the control level is "0", "1.0"; and when the control level is "2", "c7" is multiplied to the Ti respectively (Step S35).

Still further, to the present Td is multiplied a coefficient corresponding to the control level shown in Table 1. For instance, when the control level is "−3", "d3"; when the control level is "0", "1.0"; and when the control level is "2", "d7" is multiplied to the Ti respectively (Step S36).

Then, based on serial deviations e(t) in the past, and proportional band PB, integral time Ti and differential time Td to which coefficients in accordance with the control levels are multiplied, with the above arithmetic expression, PID (proportional, integral and differential) operation calculates a manipulated variable m(t) of the valve opening this time (Step S37); from the calculation result is calculated a target valve opening; and a calculated valve opening is set to be the target opening (Step S38).

With the above operation, the target opening that the expansion valve 4 should reach is set, and after storing the target opening to the RAM 11d, the micro processor 11 supplies a driving signal from the driver IC 14a of the motor-driven valve driving circuit 14 to the pulse motor 4a in such a manner that the valve opening of the expansion valve 4 becomes the target opening stored in the RAM 11d.

Next, control motion performed by the valve controller 8 of the above-mentioned refrigeration cycle system 1, mainly, the motion of the micro processor 11 constituting a main section of the valve controller 8 will be explained with reference to FIGS. 1, 2 and 7, in case that to the changing amount of the valve opening m(t) is multiplied the coefficient shown in Table 1. In the control motion, the micro processor 11, with the timer 11e, performs interrupt processing shown in FIG. 7 at predetermined intervals for example at one-second intervals.

Figure 7:
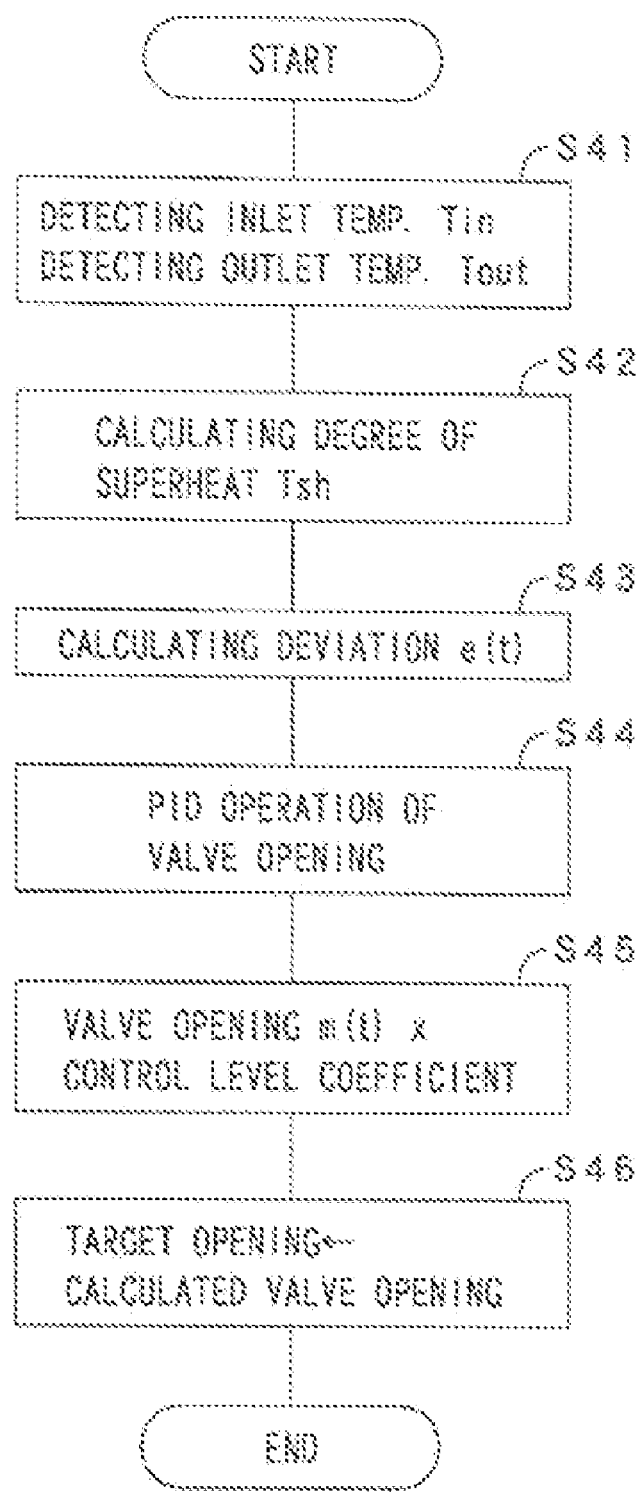
FIG. 7 is a flow chart for explaining an example of interrupt processing motion of the valve controller shown in FIG. 2.
Figure 1:
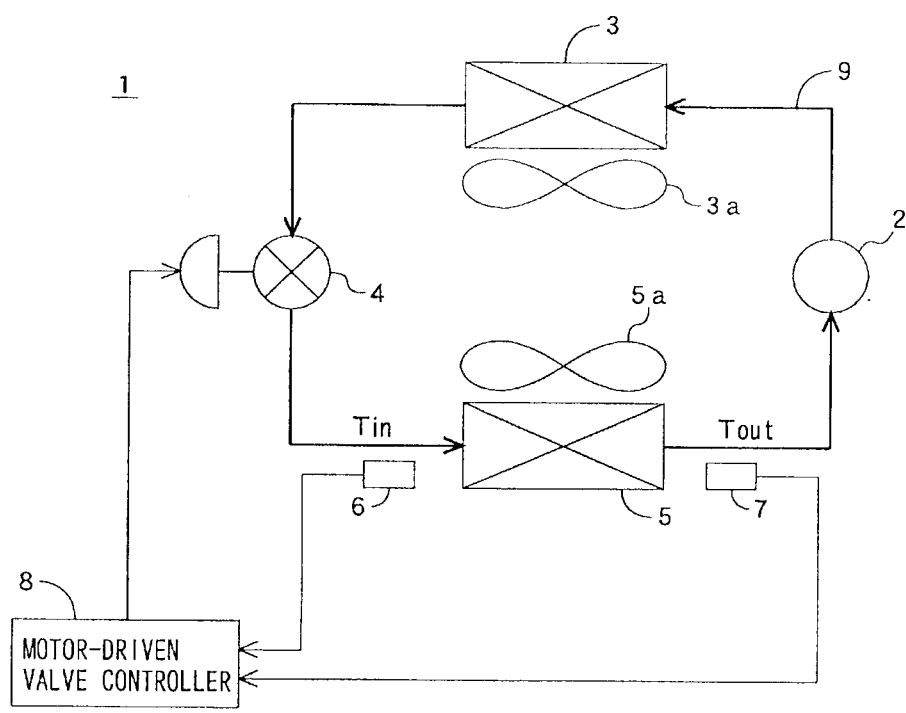
Figure 2:
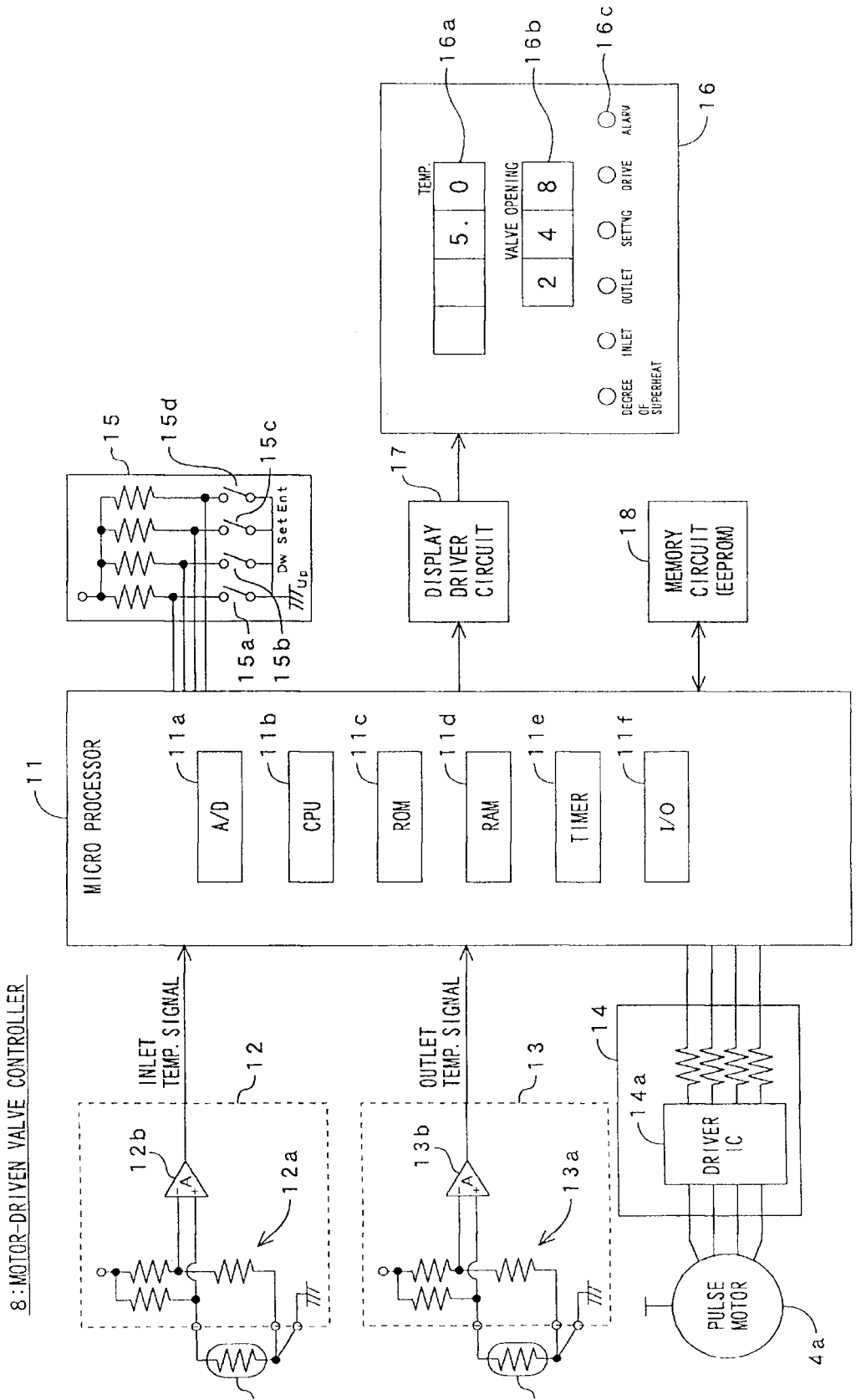
Figure 3:
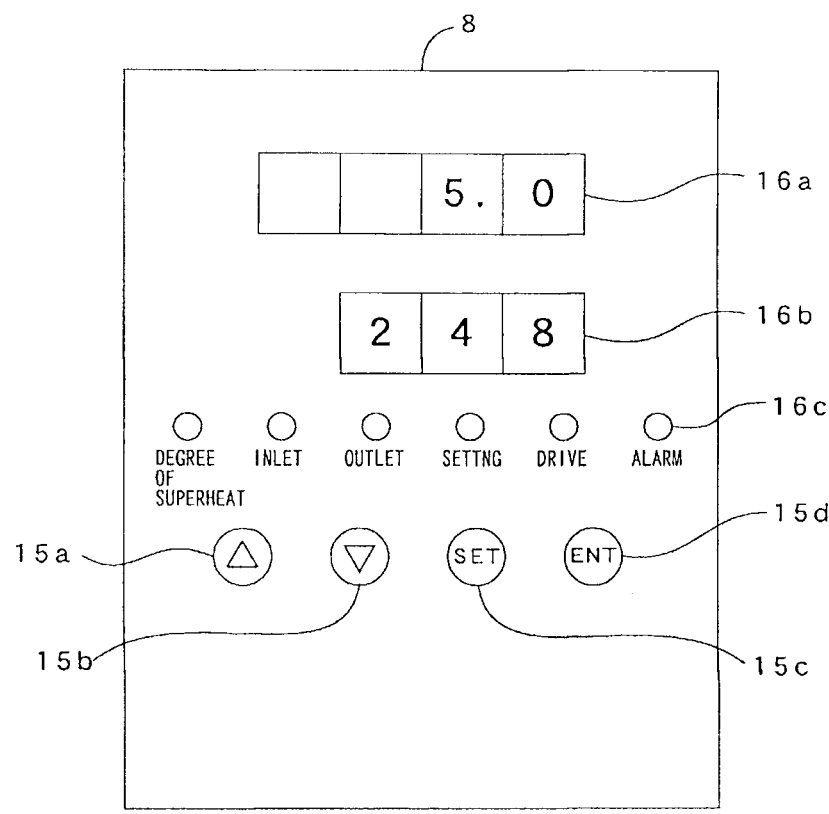
Figure 4:
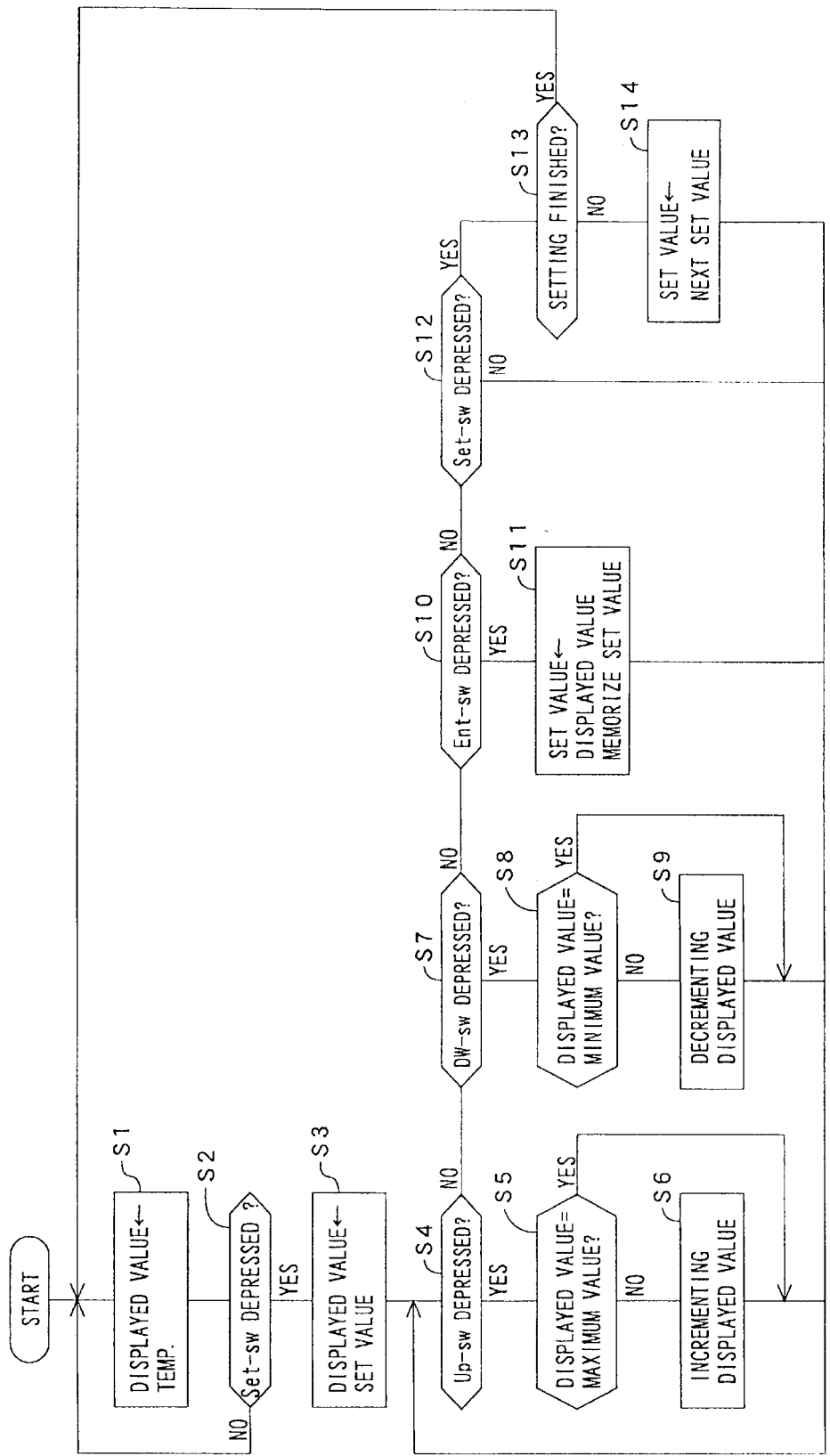
Figure 5:
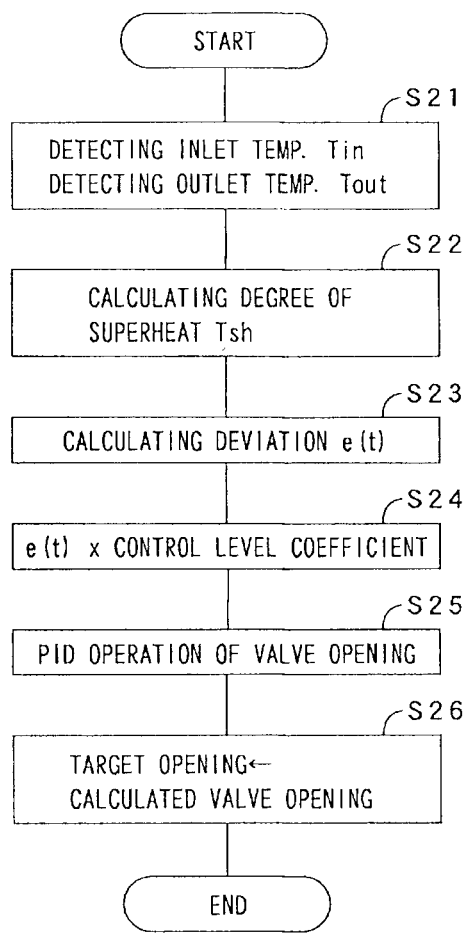
Figure 6:
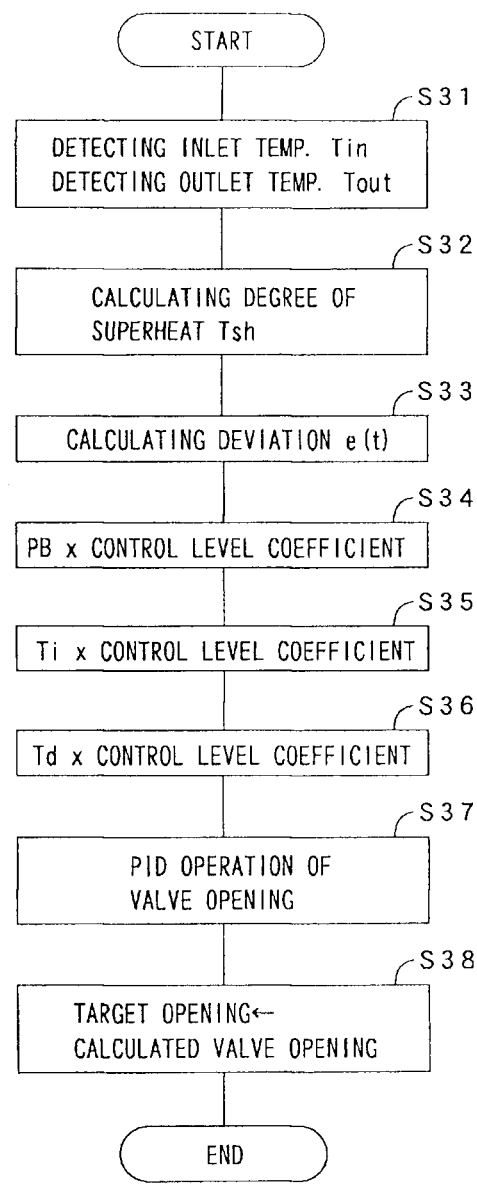
Figure 7:
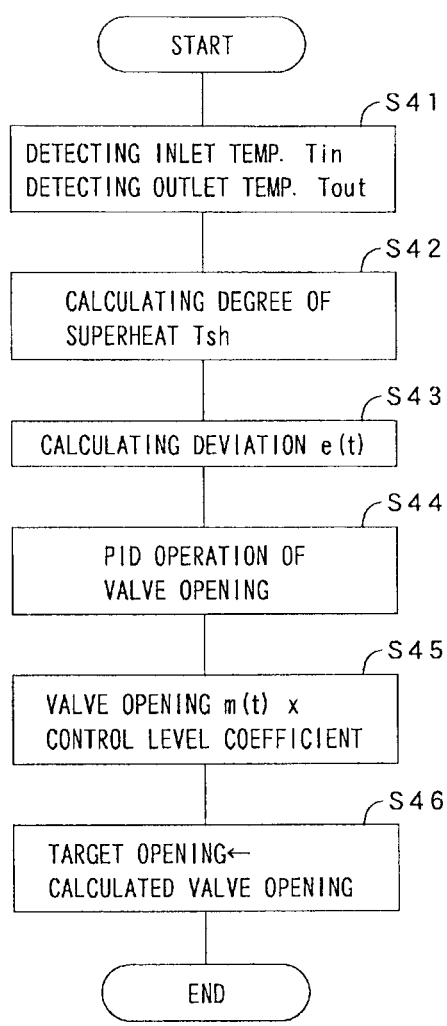

When the interrupt processing starts, as shown in FIG. 7, the CPU 11b firstly captures each of the temperatures Tin and Tout of the refrigerants, which are A/D converted, at the inlet and outlet of the evaporator 5 (Step S41), and calculates the present degree of superheat Tsh=Tout−Tin (Step S42). Then, the CPU 11b calculates a deviation e(t) between the set degree of superheat Ts and the present degree of superheat Tsh, that is, e(t)=Ts−Tsh (Step S43).

Next, based on serial deviations e(t) in the past, proportional band PB, integral time Ti and the differential time Td, with the above arithmetic expression, PID (proportional, integral and differential) operation calculates a manipulated variable m(t) this time (Step S44), and to the calculated manipulated variable m(t) is multiplied a coefficient corresponding to the control level shown in Table 1. For example, when the control level is "−1", "e5"; when the control level is "0", "1.0"; and when the control level is "5", "e10" is multiplied to the m(t) respectively (Step S45). From calculation result of m(t) to which the coefficient corresponding to the control level is multiplied is calculated a target opening, and a calculated valve opening is set to be the target opening (Step S46).

With the above motion, a target opening that the expansion valve 4 should reach is set, and after storing the target opening to the RAM 11d, the micro processor 11 supplies a driving signal from the driver IC 14a of the motor-driven valve driving circuit 14 to the pulse motor 4a such that the valve opening of the expansion valve 4 becomes the target opening stored in the RAM 11d.

Using the control level adjusting means of the valve controller 8 with the above construction, a user, in test drive with an actual device of the refrigeration cycle system 1 and normal operation thereof and so on, in accordance with driving condition, merely adjusts, in stages, the control level (−5 to +5) in accordance with the degree that the user desires when the user sensually wants to strengthen the control, and the user merely adjusts, in stages, the control level in accordance with the degree that the user desires when the user sensually wants to weaken the control. Concretely, in accordance with operating condition of the refrigeration cycle system 1, when sensually wanting to strengthen the control, for instance, the user firstly sets the control level "+1", then when feeling insufficient even, the user gradually increases the control level in such a manner as to be "+2", "+3" . . . , or as occasion demands, the user may skippingly increase the control level from "+1" to "+3", "+4" or "+5". On the contrary, when sensually wanting to weaken the control, the user firstly sets the control level "−1", then when feeling insufficient even, the user gradually decreases the control level in such a manner as to be "−2", "−3" . . . , or the user may skippingly decrease the control level from "−1" to "−3", "−4" or "−5".

In addition, with the valve controller 8 described above, only adjustment of the control level is carried out, so that it is unnecessary to store or memorize a set value of each coefficient PB, Ti and Td. Further, during the adjustment of the control level (−5 to +5), when it is desired to return to the automatic tuning state, selecting "0" of the control level allows the state to instantly be returned, as another advantage.

As described above, a work for obtaining the optimum controllability while confirming controllability of temperature as well as changing each coefficient PB, Ti and Td as before becomes unnecessary, even a user without abundant experience and expert knowledge is able to obtain the optimum controllability in a short period of time. In addition, in the past, inappropriate changing manner of each coefficient may, on the contrary, deteriorate controllability, which is also avoidable. As a result, it becomes possible to provide valve controller 8 and so on that are convenient for users.

Meanwhile, although controlled object of the present invention is exemplarily controlled by PID in the above embodiments, P (proportional) control, PI (proportional and integral) control, or PD (proportional and differential) control can be used. In addition, in the above embodiments, a pulse motor is exemplarily shown as an actuator, however, the kinds of the actuator is not limited to the pulse motor, servo motor or the like may be used. Further, as the temperature sensors 6, 7, platinum thermometric resistors are exemplarily shown, thermometric resistors with copper, nickel and others, thermocouples, thermistors or the like may be used for the temperature sensors.

Further, in the embodiments described above, the input circuit 15 is exemplarily provided with tact switches, construction of the input circuit 15 is not limited to this, but dip switches may be used, or without switches, the input circuit 15 can be constructed with setting means through communication. When the input circuit 15 is constructed with setting means through communication, on a transmitter side, set value and the like can be inputted while observing them, so that it is not always required to provide the display circuit 16 to the valve controller 8.

EXPLANATION OF SIGNALS

1 refrigeration cycle system
2 compressor
3 condenser
3a fan for condenser
4 expansion valve
4a pulse motor
5 evaporator
5a fan for evaporator
6 inlet temperature sensor
7 outlet temperature sensor
8 valve controller
9 conduit
11 micro processor
11a A/D converter
11b CPU
11c ROM
11d RAM
11e timer
11f I/O
12 inlet temperature detecting circuit
12a bridge circuit
12b amplifying circuit
13 outlet temperature detecting circuit
13a bridge circuit
13b amplifying circuit
14 motor-driven valve driving circuit
14a driver IC
15 input circuit
15a up switch
15b down switch
15c set switch
15d enter switch
16 display circuit
16a temperature displaying element
16b valve opening displaying element
16c LEDs
17 display driver circuit
18 memory circuit $$m(t) = K_p \left\{ e(t) + \frac{1}{T_i} \int e(t) dt + T_d \frac{de(t)}{dt} \right\} \quad \text{[Formula 1]}$$

$$\text{where,} \quad K_p = \frac{100}{PB}$$

TABLE 1

| | | | MULTIPLIED COEFFICIENTS | | | |
| | | DEVIATION | CONTROL PARAMETERS | | | VALVE OPENING |
| | CONTROL LEVEL | $xe(t)$ | $xPB$ | $xTi$ | $xTd$ | $xm(t)$ |
|---|---|---|---|---|---|---|
| WEAK | −5 | $a_1$ | $b_1$ | $c_1$ | $d_1$ | $e_1$ |
| | −4 | $a_2$ | $b_2$ | $c_2$ | $d_2$ | $e_2$ |
| | −3 | $a_3$ | $b_3$ | $c_3$ | $d_3$ | $e_3$ |
| | −2 | $a_4$ | $b_4$ | $c_4$ | $d_4$ | $e_4$ |
| | −1 | $a_5$ | $b_5$ | $c_5$ | $d_5$ | $e_5$ |
| NO CHANGE | 0 | 1.0 | 1.0 | 1.0 | 1.0 | 1.0 |
| | 1 | $a_6$ | $b_6$ | $c_6$ | $d_6$ | $e_6$ |
| | 2 | $a_7$ | $b_7$ | $c_7$ | $d_7$ | $e_7$ |
| | 3 | $a_8$ | $b_8$ | $c_8$ | $d_8$ | $e_8$ |
| | 4 | $a_9$ | $b_9$ | $c_9$ | $d_9$ | $e_9$ |
| STRONG | 5 | $a_{10}$ | $b_{10}$ | $c_{10}$ | $d_{10}$ | $e_{10}$ |

TABLE 2

| STRENGTH OF CONTROL | PB | Ti | Td |
|---|---|---|---|
| STRENGTHEN | SMALL | SMALL | LARGE |
| WEAKEN | LARGE | LARGE | SMALL |

TABLE 3

| No. | SYMBOL | SETTING ITEM | MINIMUM VALUE | MAXIMUM VALUE | UNIT |
|---|---|---|---|---|---|
| 0. | SH | DEGREE OF SUPERHEAT | 1 | 30 | °C. |
| 1. | HV | UPPER LIMIT | 1 | 500 | PULSE |

TABLE 3-continued

| No. | SYMBOL | SETTING ITEM | MINIMUM VALUE | MAXIMUM VALUE | UNIT |
|---|---|---|---|---|---|
| 2. | LV | LOWER LIMIT | 0 | 499 | PULSE |
| 3. | P | P | 1 | 100 | % |
| 4. | i | I | 1 | 5000 | SECOND |
| 5. | d | D | 0 | 5000 | SECOND |
| 6. | SV | STARTING OPENING | 0 | 500 | PULES |
| 7. | St | STARTING TIME | 0 | 1200 | SECOND |
| 8. | CL | CONTROL LEVEL | −5 | 5 | — |

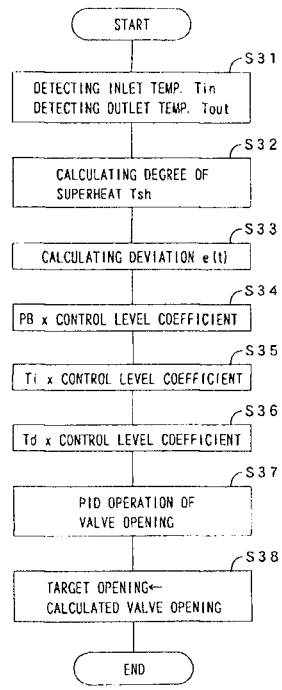

The invention claimed is:

1. A valve controlling method of controlling valve opening by calculating said valve opening such that a detected temperature coincides with a target temperature comprising the steps of:
calculating a deviation between the detected temperature and the target temperature, calculating the valve opening by substituting at least the deviation and a set control parameter into an arithmetic expression, and automatically setting said control parameter; and
adjusting a magnitude of the valve opening calculated with the arithmetic expression by multiplying a predetermined coefficient according to the control level that can be set in stages to the deviation, the control parameter, or a changing amount of the valve opening calculated by the arithmetic expression.

2. The valve controlling method as claimed in claim 1, wherein said valve is an expansion valve in a refrigeration cycle system, and said detected temperature is a degree of superheat.

3. The valve controlling method as claimed in claim 1, wherein said arithmetic expression is a control arithmetic expression used for one of P control, PI control, PD control and PID control.

4. A valve controller for performing the valve controlling method claimed in claim 1, said valve controller comprising:
automatic tuning means for calculating a deviation between the detected temperature and the target temperature, calculating the valve opening by substituting at least the deviation and a set control parameter into an arithmetic expression, and automatically setting said control parameter; and
control level adjusting means for adjusting a magnitude of the valve opening calculated with the control parameter set by the automatic tuning means in stages in accordance with a set control level.

* * * * *

UNITED STATES PATENT AND TRADEMARK OFFICE
CERTIFICATE OF CORRECTION

PATENT NO. : 8,271,142 B2
APPLICATION NO. : 12/403087
DATED : September 18, 2012
INVENTOR(S) : Ogawa It is certified that error appears in the above-identified patent and that said Letters Patent is hereby corrected as shown below:

Please delete the title page and insert the title page showing an illustrative figure as attached.

In the Drawings

Please Delete drawing sheets 1-7 and insert drawing sheets 1-7 with figures 1-7 as attached.

Signed and Sealed this
Twenty-eighth Day of May, 2013

Teresa Stanek Rea
*Acting Director of the United States Patent and Trademark Office*

(12) United States Patent
Ogawa

(10) Patent No.: US 8,271,142 B2
(45) Date of Patent: Sep. 18, 2012

(54) DEVICE AND METHOD FOR CONTROLLING VALVE

(75) Inventor: Yoshio Ogawa, Setagaya-ku (JP)

(73) Assignee: Fujikoki Corporation, Tokyo (JP)

( * ) Notice: Subject to any disclaimer, the term of this patent is extended or adjusted under 35 U.S.C. 154(b) by 860 days.

(21) Appl. No.: 12/403,087

(22) Filed: Mar. 12, 2009

(65) Prior Publication Data

US 2009/0228153 A1   Sep. 10, 2009

(51) Int. Cl.
 *G05D 7/00* (2006.01)
 *G05D 11/00* (2006.01)
 *G05B 13/02* (2006.01)

(52) U.S. Cl. ............. 700/282; 700/41; 700/42; 700/43; 700/289; 702/45; 137/51

(58) Field of Classification Search .............. 700/37, 700/41–43, 282, 289; 702/45; 137/51
 See application file for complete search history.

(56) References Cited

U.S. PATENT DOCUMENTS

| | | | |
|---|---|---|---|
| 7,021,298 B2* | 4/2006 | Nakazawa et al. | 123/568.14 |
| 7,320,434 B2* | 1/2008 | Suda et al. | 236/34 |
| 7,903,700 B2* | 3/2011 | Nagai et al. | 372/20 |
| 2003/0100451 A1* | 5/2003 | Messier et al. | 507/100 |
| 2003/0102125 A1* | 6/2003 | Wellington et al. | 166/266 |
| 2003/0167822 A1* | 9/2003 | Johnson et al. | 73/1.16 |
| 2005/0006487 A1* | 1/2005 | Suda et al. | 236/46 R |
| 2005/0229909 A1* | 10/2005 | Nakazawa et al. | 123/568.14 |
| 2007/0155019 A1* | 7/2007 | Johnson et al. | 436/180 |

* cited by examiner

*Primary Examiner* — Ramesh Patel
(74) *Attorney, Agent, or Firm* — Stetina Brunda Garred & Brucker

(57) ABSTRACT

Provided is an easy to use valve controller designed to obtain optimum operation performance. The valve controller is designed to control the valve opening of an expansion valve by calculating the valve opening such that a detected temperature coincides with a target temperature. The valve controller includes an automatic for calculating a deviation between the detected temperature and the target temperature and for calculating a changing amount of the valve opening by substituting at least the deviation and a set control parameter into an arithmetic expression to automatically set the control parameter. The valve controller further includes and control level adjuster for adjusting a magnitude of the valve opening calculated with the control parameter set by the automatic tuning means in stages in accordance with a set control level.

4 Claims, 7 Drawing Sheets